United States Patent [19]

Hansel et al.

[11] Patent Number: 5,707,158
[45] Date of Patent: Jan. 13, 1998

[54] METHOD FOR GENERATING A PRINT FORMAT THAT IS PRINTED ONTO A CARRIER IN A POSTAGE METER MACHINE

[75] Inventors: Marcus Hansel; Norbert Knoth; Peter Rieckhoff, all of Berlin, Germany

[73] Assignee: Francotyp-Postalia AG & Co., Birkenwerder, Germany

[21] Appl. No.: 706,504

[22] Filed: Sep. 5, 1996

[30] Foreign Application Priority Data

Sep. 7, 1995 [EP] European Pat. Off. ............ 95 114 057

[51] Int. Cl.$^6$ ............................................. B41J 5/00
[52] U.S. Cl. ..................... 400/61; 400/70; 364/464.02
[58] Field of Search .................. 364/464.02; 400/61, 400/62, 65, 70, 76

[56] References Cited

U.S. PATENT DOCUMENTS

| | | | |
|---|---|---|---|
| 4,739,343 | 4/1988 | Dolan | 400/207 |
| 5,038,153 | 8/1991 | Liechti et al. | |
| 5,146,546 | 9/1992 | Neuhard et al. | |
| 5,471,925 | 12/1995 | Heinrich et al. | |
| 5,513,563 | 5/1996 | Berson | 400/124.3 |
| 5,628,249 | 5/1997 | Cordery et al. | 400/82 |

FOREIGN PATENT DOCUMENTS

| | | |
|---|---|---|
| 0 261 978 | 3/1988 | European Pat. Off. |
| 0 416 508 | 3/1991 | European Pat. Off. |
| 0 576 113 | 12/1993 | European Pat. Off. |
| 0 578 042 | 1/1994 | European Pat. Off. |

*Primary Examiner*—John S. Hilten
*Attorney, Agent, or Firm*—Hill, Steadman & Simpson

[57] ABSTRACT

In a method for generating a print format that is printed onto a carrier in a postage meter machine, the print format being composed of picture elements in the fashion of an xy-matrix to which picture element data are allocated in a memory, a microprocessor controlling the generation of the print format accesses a number of picture element datafiles. Picture element data that define an image element or a text element of the print format are combined in each picture element datafile. Each picture element datafile also has an identification code allocated to it under which the appertaining image element or text element can be found. The microprocessor also accesses a control datafile that contains a number of sub-image datafiles that respectively contain sub-image data that define a sub-image of the print format. The microprocessor processes the sub-image datafiles of the print format to be printed and, when processing the sub-image datafiles, employs the sub-image data for generating the print format from the picture element data of at least one picture element datafile identified by the respective reference code. The microprocessor ends the generation of the print format after the processing the sub-image datafiles.

31 Claims, 7 Drawing Sheets

METHOD FOR GENERATING A PRINT FORMAT THAT IS PRINTED ONTO A CARRIER IN A POSTAGE METER MACHINE

BACKGROUND OF THE INVENTION

1. Field of the Invention

The invention is directed to a method for generating a print format which is printed onto a carrier in a postage meter machine, the print format being composed of picture elements in an xy-matrix with picture element data in a memory being allocated to the picture elements.

2. Description of the Prior Art

German 05 42 21 270 discloses a method of print format modification for a postage meter machine wherein data for the constant parts of the print format and data for the variable parts of the print format are stored in separate memory areas in order to save memory space. For modifying a print format, the steps of loading the printing data, selecting the constant part of the print format, editing the variable print format data and compiling and displaying the print format are implemented. Given a number of selection possibilities for the formatting of the print format from predetermined image or text elements, the outlay increases both for the interface for editing a print format by the customer or user of the postage meter machine as well as for the subsequent compiling of the print format to form an overall presentation of the selected image or text elements during printing with a microprocessor. It is especially undesirable that the program part for generating the respective print format must be modified repeatedly to meet the customer's specifications when new selection possibilities on the basis of new image and text elements are added. The adaptation of the executive steps for generating the print format requires new programming outlay connected with new test runs and outlay for the care of the program such as, for example, documentation and assistance functions. Together with an increasing number of variably composable image and text elements of a print format, the time for the generation thereof also becomes longer, which may potentially have a disadvantageous effect on the printing speed if the print format changes from imprint to imprint.

SUMMARY OF THE INVENTION

An object of the present invention is to provide a method for generating a print format that is printed onto a carrier in a postage meter machine which can be applied to different print format contents and arrangements of image and text parts of a print format, and which has an executive sequence structure with respect to the method steps that need not be modified given a modification of the type or number of image and text elements.

According to a first embodiment of the invention, this object is achieved in a method wherein the following steps are implemented. A microprocessor that controls the generation of the print format accesses a plurality of picture element datafiles. Picture element data that define a picture element or a text element of the print format are combined in picture element datafile. Each picture element datafile has an identification code allocated to it under which the associated picture element or text element can be found; the microprocessor also accesses a control datafile which contains a number of sub-image datafiles that respectively contain sub-image data which define a sub-image of the print format. Each sub-image datafile contains a reference code that references at least one of the identification codes of one or more of the picture element datafiles. The microprocessor processes the sub-image datafiles of the print format to be printed; in the processing of the sub-image datafiles, the microprocessor employs the sub-image data for generating the print format from the picture element data of at least one picture element datafile referenced by the respective reference code, and ends generation of the print format after the processing of the sub-image datafiles.

The invention is based on storage of the actual image data in picture element datafiles in the memory of the postage meter machine and the arrangement of the picture element data and their processing when generating the print format prescribed in a program, as well as the processing of a control datafile when generating the print format.

The resolution of the print format into sub-images, which is known in the prior art, is also retained in the method of the invention. Additionally, however, data that define a sub-image are stored in the respective sub-image datafiles. Control data with respect to how the picture element data belonging to a sub-image are to be processed when generating the print format, for example the x-position and y-position of a sub-image or the alignment thereof with respect to the overall image, are contained in these sub-image datafiles. Due to the sub-image datafiles contained in the separate control datafile, the possibility is established of leaving the basic steps of the method for generating the print format unmodified in a number of different print formats.

The allocation between the picture element datafiles and the sub-image datafiles ensues by means of a reference code that in turn references the identification code of one or more picture element datafiles. The identification code unambiguously identifies the individual picture element datafiles in the fashion of a name. The separation and unambiguous allocation of the control data and picture element data that enables the application of a printing process to a number of print formats with unmodified program structure is possible due to the reference codes and the identification codes.

In one version of the invention every sub-image datafile also has a sub-image sequence code allocated to it that references the next sub-image datafile in a sequence of sub-image datafiles. The last sub-image datafile of the sequence of sub-image datafiles has an end of sub-image mark allocated to it as its sub-image sequence code, on the basis of which a determination can be made that no further sub-image datafile that belongs to this sequence of sub-image datafiles is stored in the memory. The microprocessor successively processes the sequence of sub-image datafiles, and the microprocessor ends the generation of the print format when the end of sub-image mark has been found.

Due to the arrangement of the sub-image datafiles in a sequence, it is possible in the invention—after the sequence of sub-image datafiles in the memory of the postage meter machine has been produced—to print a number of print formats without having to modify the method-defining program structure for a control program of the microprocessor. In this version of the method, each sub-image datafile contains a sub-image sequence code that references a next sub-image. It is thus possible to successively process the sequence of sub-image datafiles when generating the associated sub-images. Expediently, the sub-image sequence code is an address in which the beginning of a (possibly) following sub-image datafile is stored. The end of the executive method is determined with reference to the end of sub-image mark in the last sub-image datafile of the sequence of sub-image datafiles, since there are obviously no more sub-image datafiles in the sequence of sub-image datafiles after the end of sub-image mark has been encountered.

According to a further embodiment of the invention, the aforementioned object is achieved in a method wherein the following steps are implemented. A microprocessor controlling the generation of the print format accesses a plurality of picture element datafiles, with picture element data that define an image element or a text element of the print format being combined in every picture element datafile. An identification code under which the appertaining image element or text element can be found is allocated to each picture element datafile. Each picture element datafile, further, has a picture element sequence code allocated to it that references the next picture element datafile in a sequence of picture element datafiles, and with the last picture element datafile in a sequence of picture element datafiles having an end of picture element mark allocated to it as its picture element sequence code, with reference to which it can be determined that no further picture element datafile that belongs to this sequence is stored in the memory. The microprocessor accesses a control datafile in which control data for the print format to be printed are contained, with a reference being made in the control datafile to at least one of the identification codes whose text element or image element is to be printed. The microprocessor searches the sequence of picture element datafiles for the identification code and, when this identification code has been found, the microprocessor employs the picture element data of the appertaining picture element datafile to generate the print format or generates an error message if and when the end of picture element mark is found.

By separating picture element datafiles and control datafiles, it is possible to retain the method structure in case the picture element data change, since only the former are affected by the change. The arrangement of the picture element datafiles in a sequence assures that the structure of the control program for accessing the picture element datafiles is independent of the type and plurality of the latter. The identification code makes it possible to identify a specific picture element datafile during the search in a simple way. The sequence code makes it possible to search the sequence of picture element datafiles with a search algorithm successively and independently of their number and content. The search algorithm is a component subroutine of the control program for accessing the picture element datafiles. As a result of the search, picture element datafile with the prescribed identification code is found or the end mark is reached. The end mark, finally, makes it possible to recognize the end of the sequence of picture element datafiles and, as warranted, to abort the search with an error message.

In a preferred embodiment of the invention the control datafile further contains a number of image datafiles, each image datafile containing print format data that define a print format and each image datafile having an image identification code allocated to it under which the appertaining print format can be found. Each image datafile also has an image sequence code allocated to it that references the next image datafile in the sequence of image datafiles. The last image datafile of the sequence of image datafiles has an end of image mark allocated to it as its image sequence code with reference to which a determination can be made that no further image datafile that belongs to this sequence of image datafiles is stored in the memory. When accessing the control data, the microprocessor searches the sequence of image datafiles for an image identification code that corresponds to a predetermined or selected print format to be printed. When the microprocessor finds this image identification code, the microprocessor employs the print format data of the appertaining image datafile for controlling the generation of the print format ar generates an image error message if it finds the end of image mark.

The method according to this embodiment can be applied for generating a print format that has been selected from a number of existing print formats. The structure of the control program for the access to the control datafile and the image datafiles is independent of the number of image datafiles as a result of this embodiment. As explained above, the structure of the required search algorithm can be retained independently of the number of image datafiles. The image identification code makes it possible to unambiguously identify the image datafile that corresponds to the print format to be printed. With the assistance of the image sequence code, the sequence of image datafiles can be searched with the same search algorithm successively and independently of their type and content. The end of image mark allows a determination to be made regarding when the last image datafile is reached. If, during the search of the sequence of image datafiles beginning with the first image datafile of the sequence of image datafiles, the search algorithm finds the end of image mark without finding an image datafile having the predetermined image identification code, then the search is aborted and an image error message is emitted as an output.

The method of the invention can be expediently fashioned such that a succession of picture element datafiles in the sequence of picture element datafiles is defined dependent on the frequency of access to the respective picture element datafile. This means that picture element datafiles that contain image or text elements that change frequently during operation of the postage meter machine (such as, for example, the character set for the postage value) are stored at the start of the sequence of picture element datafiles and image or text elements that need be less frequently accessed are stored toward the end of the sequence. The access time can be substantially shortened as a result of this measure, this being a great advantage particularly given a multitude of picture element datafiles, since the number of searched datafiles up to the search hit is reduced.

In particular, the method can be implemented such that at least one picture element datafile contains picture element data that represent an element of a machine-readable identifier. This machine-readable identifier, for example, could be a bar code element. In these cases, no modification of the structure of the method steps need be undertaken. Appropriate picture element datafiles merely have to be loaded into the data memory of the postage meter machine and appropriate sub-image datafiles which describe the print format that contains the bar code, be made available.

In a further advantageous embodiment of the invention an address pointer whose value is zero is employed as the end of picture element mark, the end of image mark and the end of sub-image mark. Such an address pointer is referred to below as a zero pointer. By employing zeroes as data in a memory cell, it is especially easy to determine whether a memory cell contains a zero pointer or not. Upon recognition of a zero pointer, the method does not access the address with the value "zero" but instead interprets the value of the zero pointer as an end mark.

DESCRIPTION OF THE PREFERRED EMBODIMENTS

Figure 1:
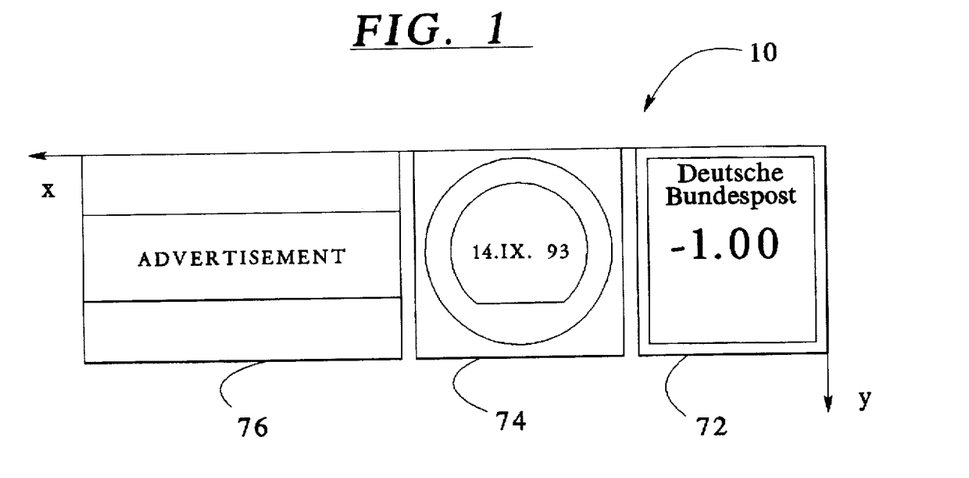
FIG. 1 shows a print format to be printed onto a carrier in a postage meter machine, such as by means of the inventive method.

FIG. 1 shows a print format 10 that is to be printed onto a carrier, for example onto the paper of an envelope, after the generation of the print format 10 in the data memory of a postage meter machine using the inventive method. As a prerequisite for the generation, data which define the print format must be deposited in the data memory of the postage meter machine. Therefore, a possible arrangement of the data of the print format in the data memory is first explained.

The print format 10 is composed of a postage stamp imprint 12, a date stamp imprint 14 and an advertising image 16. The right upper corner of the print format 10 can be selected as the origin of an xy-coordinate system, that lies at the intersection of a horizontal x-axis referenced x and a vertical y-axis referenced y.

Figure 2:
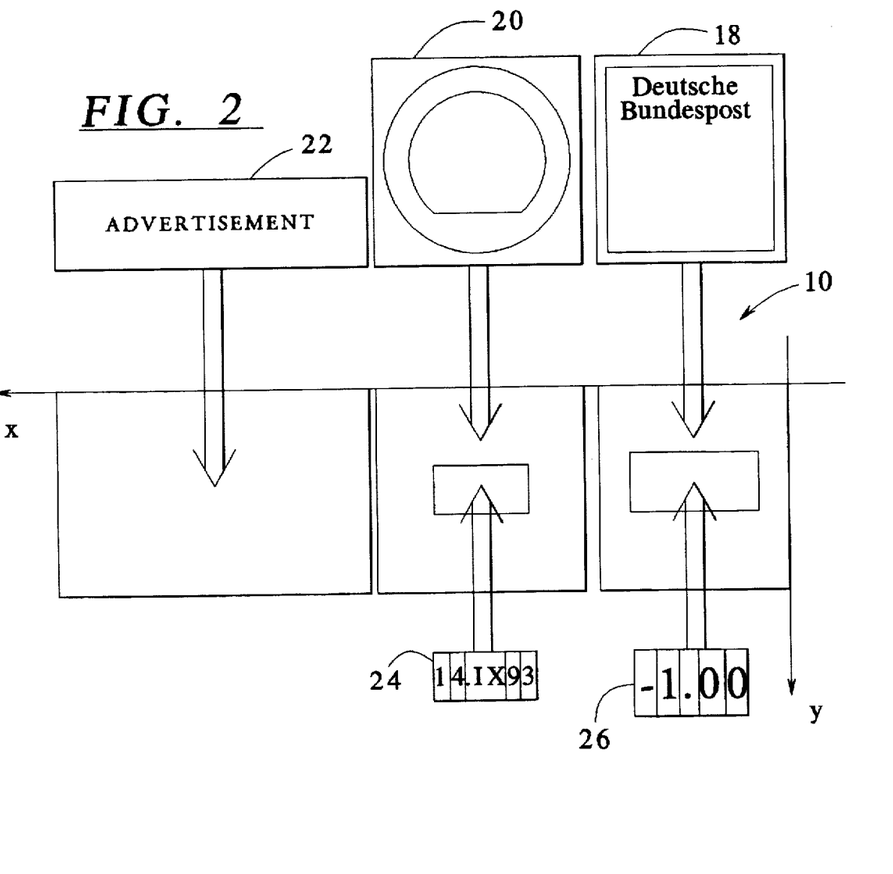
FIG. 2 shows the resolution of the print format of FIG. 1 into sub-images in accordance with the inventive method.

As shown in FIG. 2, the print format is resolved into five sub-images 18 through 26. A frame image 18 for the postage stamp and a frame image 20 for the date stamp are permanently prescribed sub-images. The sub-image 22 for the advertising and the sub-image 24 for the date are variable, as is the value of the postage in the sub-image 26. The sub-image 24 for the date and the sub-image 26 for the postage value are subdivided again into text elements. Five text elements are thus contained in the sub-image 24 for the date and five text elements are likewise contained in the sub-image 26 for the postage value. These text elements are specific characters of a predetermined character set.

The spatial (area) position of the sub-images 18 through 26 can be described with respect to the xy-coordinate system with the assistance of the x and y coordinates. The upper right corner of the respective sub-images 18 through 26 usually serves as the point of reference. The size of the sub-images 18 through 26 is respectively indicated by respective values for the extent in the x-direction and in the y-direction.

The print format 10 is composed of picture elements corresponding to the xy-coordinate system. The picture element data respectively allocated to the picture elements are stored in the memory of the postage meter machine. The data structures needed for accessing these data shall be explained below. As needed, the reference characters shown in the Figures are supplemented by lower case letters when identifying the same data structure, but with different contents.

Figure 3:
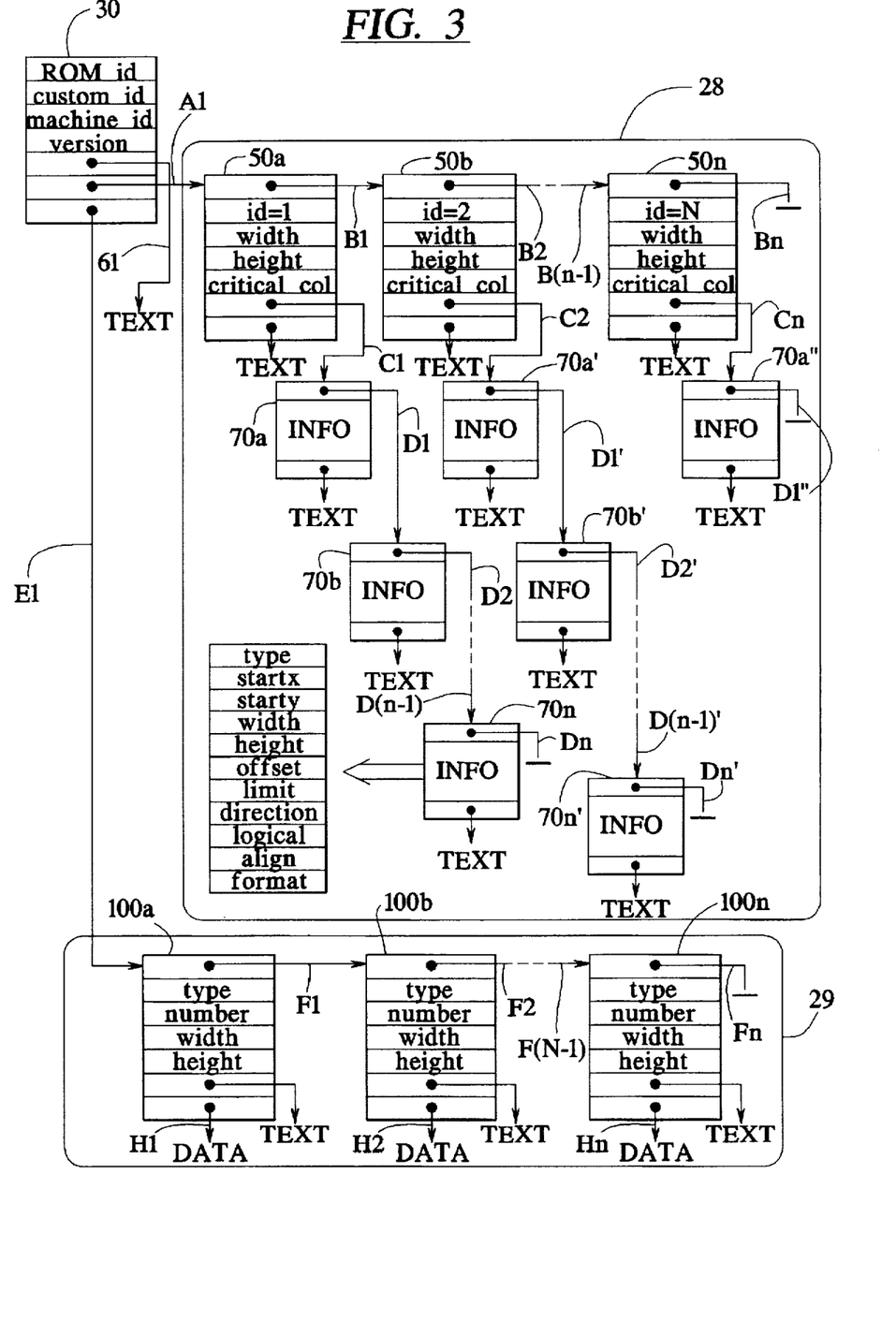
FIG. 3 shows the basic operation of the data structures in the data memory of a postage meter machine constructed and operating in accordance with the principles of the present invention.

FIG. 3 shows the fundamental inventive operation of data structures for the definition of print formats in the memory of the postage meter machine. In FIG. 3, the data which define the print formats and also control the generation of the print format 10 are combined in a control datafile 28 symbolized with the assistance of a frame. The actual picture element data that contain the image information for so-called imprints are shown in a further frame 29 in FIG. 3.

Proceeding from a root datafile 30 in which initial data for the program to be processed by the microprocessor are deposited, access to a first print format datafile 50a is possible with a start of image pointer, symbolized by the arrow A1. This first image datafile 50a describes a first print format and contains control data for generating this print format. From this image datafile 50a, a second image datafile 50b for describing a second print format can be accessed with the assistance of a first image pointer B1. With the assistance of a second image pointer B2, further image datafiles (not shown) for further print formats can be successively accessed from the second image datafile 50b until one proceeds to a last image datafile 50n for a last print format with the assistance of an image pointer B(n−1). As its image pointer Bn, the image datafile 50n contains a zero pointer that indicates that no further image datafile follows.

The image datafiles 50a, 50b and 50n are respectively identified with the assistance of an image identification code, for example Id=1, Id=2, . . . , Id=n. Accordingly, one of the image pointers B1 through Bn is located in each image datafile 50a, 50b, 50c. A sequence of image datafiles 50a, 50b, . . . , 50n shown in FIG. 3 thus arises, whereby the dots express that the sequence of image datafiles can also contain further image datafiles.

A respective start of image pointer C1, C2 and Cn is located in the image datafiles 50a, 50b, 50c. Thus, the image datafile 50a has the start of image pointer C1 for access onto the data for defining a first sub-image in a sub-image datafile 70a that belongs to the first print format. Correspondingly, the image datafile 50b has the start of image pointer C2 for access onto the data for defining a first sub-image in a sub-image datafile 70a' belonging to the second print format. The image datafile 50n has the start of image pointer Cn for access onto the data for defining a first sub-image in a sub-image datafile 70a" belonging to the last print format.

The sub-image datafile 70a has a sub-image pointer D1 directing access to a second sub-image datafile 70b that contains data for describing a second sub-image of the first print format. From the second sub-image datafile 70b, further sub-image datafiles (not shown) can be successively accessed with the assistance of a second sub-image pointer D2 and further sub-image pointers until one proceeds to a last sub-image datafile 70n of the first print format with the assistance of a sub-image pointer D(n−1).

The second sub-image datafile 70b' for describing the second print format can be accessed from the first sub-image datafile 90a' of the second print format with the assistance of a sub-image pointer D1'. From the second sub-image datafile 70b', further sub-image datafiles (not shown) for describing further sub-print formats can be successively accessed with the assistance of a second sub-image pointer D2' and further sub-image pointers until one proceeds to a last sub-image datafile 70n' for this print format with the assistance of a sub-image pointer D(n−1).

In this example, no access to further sub-image datafiles of the last print format is possible from the first sub-image datafile 70a" of this last print format because it is composed of only a single sub-image.

As sub-image pointers Dn, Dn' and D1", the sub-image datafiles 70n, 70n' and 70n" respectively contain a zero pointer that, as an end of sub-image mark, makes clear that no further sub-image datafiles follow.

The sub-image datafiles 70a, 70b, ..., 70n thus yield a first sequence of sub-image datafiles. The sub-image datafiles 70a', 70b', ..., 70n' form a second sequence of sub-image datafiles. The sub-image datafile 70a" can be viewed as a special sequence of sub-image datafiles that is composed of only the single sub-image datafile 70a".

The sub-image datafiles 70n, 70n' and 70a" can be an $n^{th}$ sub-image datafile of the respective sequence of sub-image datafiles, whereby n, as a running variable, is an arbitrary natural number greater than zero. Further sub-image datafiles (not shown) can be respectively successively accessed with the assistance of the aforementioned image datafiles that, however, are not shown.

Picture element datafiles 100a, 100b, ..., 100n combined within the frame of FIG. 3 respectively contain picture element data that define an image element or a text element of the print format. Access to the first picture element datafile 100a is possible with the assistance of a start of picture element pointer E1 in the root datafile 30. The first picture element datafile 100a defines the picture element data of a first image or text element. From this picture element datafile 100a, the second picture element datafile 100b that defines a second image or text element can be accessed with the assistance of a first picture element pointer F1. From the second picture element datafile 100b, further picture element datafiles (not shown) can be successively accessed with the assistance of a second picture element pointer F2 and further picture element pointers until one proceeds to the last picture element datafile 100c that defines a last image or text element with the assistance of a picture element pointer F(n−1). As its picture element pointer Fn, the picture element datafile 100c contains a zero pointer that, as an end mark, makes clear that no further picture element datafile follows.

Accordingly, a picture element pointer F1, F2, Fn is located in each picture element datafile 100a, 100b, 100n. The sequence of picture element datafiles 100a, 100b, ..., 100n shown in FIG. 3 thus arises. The dots are intended to express that the picture element datafile 100n can be an $n^{th}$ picture element datafile, whereby n, as a running variable, is an arbitrary natural number greater than zero.

The picture element datafiles 100a, 100b, ..., 100n are respectively identified with the assistance of an identification code, for example "type" and "number", that allows the targeted access onto a specific sub-image datafile.

The picture element datafiles 100a, 100b, ..., 100n respectively contain a data pointer H1, H2, ... Hn that allows the access to the respective picture element data.

The root datafile 30 further contains a text pointer G1 that references a text that describes what type of data are contained in the root datafile 30. All image datafiles and sub-image datafiles within the frame 28 in FIG. 3 and all picture element datafiles within the frame 29 in FIG. 3 likewise respectively contain such a text pointer for a text for describing the respective data. This text can be employed, for example, for the selection of the sub-images by the customer or user of the postage meter machine or for menu construction when editing a print format in a user interface. By arranging the text in a separate memory area of the data memory of the postage meter machine, an adaptation to various languages, for example, can be easily achieved by interchanging the texts in this memory area.

Figure 4:
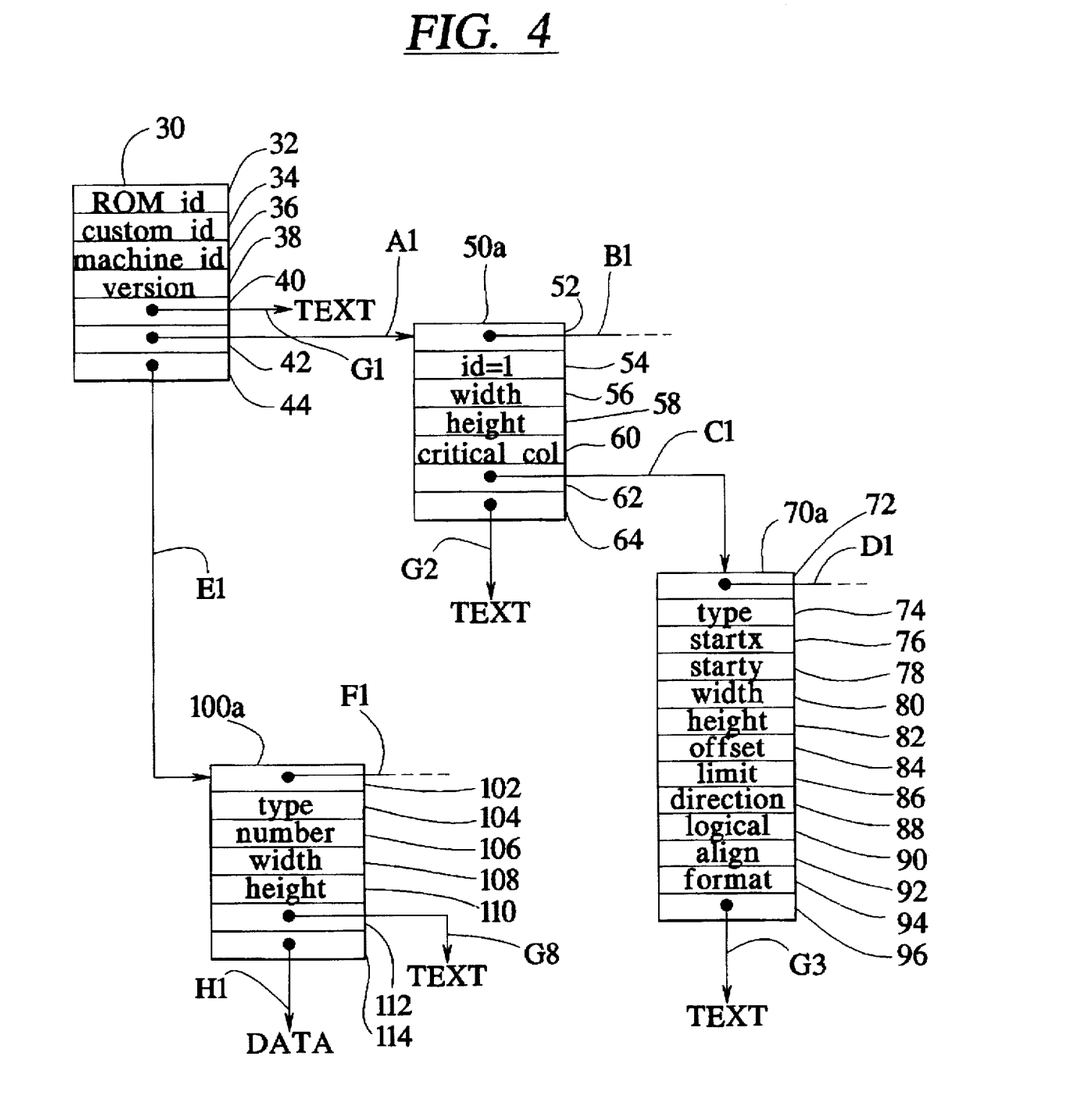
FIG. 4 shows the individual data fields of the data structures employed in the inventive method.

The individual fields of the data structures from FIG. 3 are explained with reference to FIG. 4. The root datafile 30 that forms the point of departure for the data access during execution of the method contains a field 32 for a memory identification code that identifies the storage medium on which all of the data required in the method are stored. Further, a field 34 for a customer number identifies the customer conducting the method and a field 36 for a machine number that identifies the specific postage meter machine with which printing is carried out. A field 38 for a version number indicates the version for controlling the printing that is stored in a control program. Further, there is a field 40 for the text pointer G1 for allocating a descriptive text to the root datafile, a field 42 for the start of image datafile pointer A1 that references the first image datafile 50a that describes a print format, as well as a field 44 for the start of picture element pointer E1 that references the first picture element datafile 100a that contains the picture element data of the first image or text element.

The image datafile 50a has a field for the image datafile pointer B1 that points to a next image datafile (not shown), a field 54 for an image identification code for locating the print format corresponding to a predetermination, a field 56 for storing the width of the respective print format, a field 58 for the height of the print format; as well as a field 60 for storing the critical column, which is especially important in postal-oriented terms. This image datafile 50a also contains a field 62 for the start of sub-image pointer C1 that points to the first sub-image datafile 70a that describes the first sub-image of the print format, and a field 64 for a text pointer G2 that references a text for describing the respective image datafile.

The sub-image datafile 70a has a field for storing the sub-image pointer D1 for access to a next sub-image datafile (not shown). It also contains a field 74 in which a group reference code references the type or group affiliation of one or more image or text elements belonging to the respective sub-image, as well as fields 76 and 78 for the position of the sub-image in the overall print format respectively in the x-direction or the y-direction, as well as fields 80 and 82 for the extent of the respective sub-image in the x-direction and the y-direction. Further fields of this data structure are a field 84 for a selection code that is employed for determining the affiliated image or text elements of the respective sub-image in the way described below, a field 86 for the maximum number of text elements in a sub-image, and a field 88 for storing a writing direction that indicates how the text elements should be arranged within the sub-image, for example horizontally or vertically. The sub-image datafile 70a also has a field 90 for identifying the logical operation for that case wherein two sub-images of the print format overlap, for example operations according to an AND, OR or XOR function, a field 92 for defining the alignment of the text elements, for example flush left, flush right or centered, a field 94 for the format of the date, and a field 96 for a text pointer G3 that references a text for describing the respective sub-image datafile.

The picture element datafile 100a contains a field 102 for the picture element pointer F1 that points to a next picture element datafile (not shown), a field 104 for a group identification code that indicates the type or group to which the picture element data of the picture element datafile belong, and a field 106 for storing an element identification code under which a specific picture element datafile of one of the groups can be found. The picture element datafile 100a also has a field 108 for the width and a field 110 for the height of the image or text element defined by the picture element data, a field 112 for a text pointer G8 that references a text for describing the respective picture element data, and a field 114 for storing the data pointer H1 for access to the picture element data.

Figure 5:
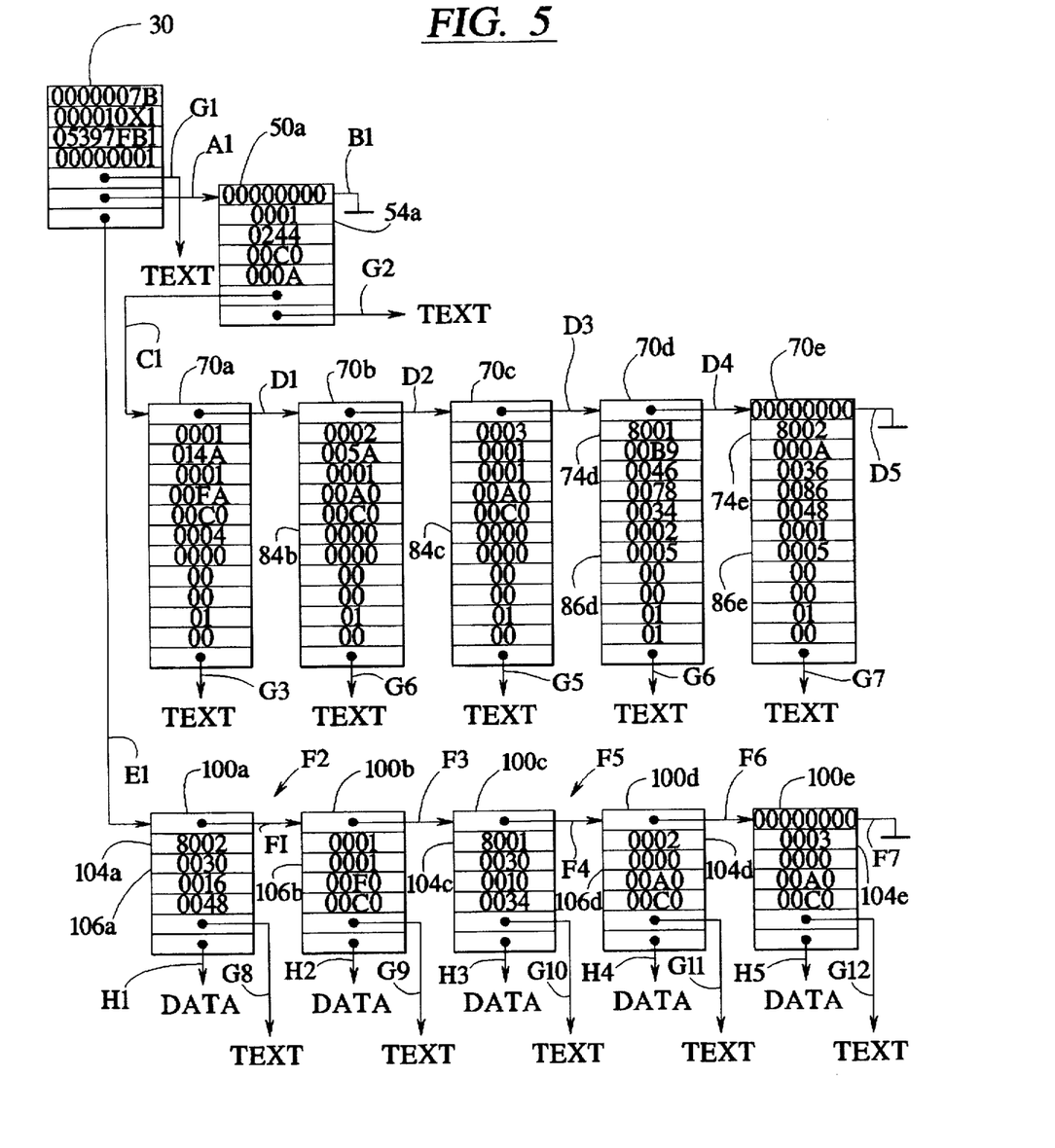
FIG. 5 shows the operation of the data structures for the print format of an exemplary embodiment of the inventive method.

FIG. 5 shows the operation of the data structure in the memory of the postage meter machine for the print format 10 shown in FIGS. 1 and 2. This operation of the data structures forms the basis of the inventive method that is explained following the description of FIG. 5. The individual fields of the data structures shown in FIG. 5 are occupied with specific values for the print format to be presented. These values are shown in hexadecimal notation and indicate the values needed for the presentation of the stamp image. The general significance of the fields of the illustrated data structures has already been explained in FIG. 4. As an example, fields with special significance shall be pointed out below.

The root datafile 30 in FIG. 5 contains the start of image datafile pointer A1 that references the first and, in this example, simultaneously last image datafile 50a, as well as the start of picture element pointer E1 that points to the first picture element datafile 100a.

In the example of FIG. 5, only a single image datafile 50a is present since only one franking image 10 is to be printed in this example. Consequently, the image pointer B1 in the image datafile 50a is the end of image mark that is identified by zeroes as a zero pointer and with reference to which the control procedure recognizes that no further image datafiles follow.

The start of sub-image pointer C1 is located in the image datafile 50a for access onto the first sub-image datafile 70a for the presentation of the sub-image 22 for the advertizing.

The sub-image pointer D1 of the sub-image datafile 70d serves for accessing the second sub-image datafile 70b for the presentation of the frame image 20 for the date. The sub-image pointer D2 of this second sub-image datafile 70b serves for accessing a third sub-image datafile 70c for the presentation of the frame image 18 for the postage. A sub-image pointer D3 of this sub-image datafile 70c serves for accessing a fourth sub-image datafile 70d for the presentation of the sub-image 24 for the respective date. A sub-image pointer D4 of this datafile points to a fifth sub-image datafile 70e for the presentation of the sub-image pointer D5 for the postage value. As its sub-image pointer D5, the sub-image datafile 70e has a zero pointer that can be recognized on the basis of eight zeroes. This zero pointer is the end of sub-image mark that indicates that there are no further sub-image datafiles in the sequence of sub-image datafiles 70a through 70e.

The group reference code in the respective fields 74d and 74e of the sub-image datafiles 70d and 70e has a special characteristic. The setting of the first bit in the group reference code makes clear that the appertaining picture element data are character set data.

In order to avoid and recognize errors during the method given sub-images wherein text is presented by characters of a character set, the number of characters that the sub-image contains is recited in a data field of the sub-image datafile. The sub-image datafields 70d and 70e thus respectively have the value 5 in respective fields 86d and 86e that indicates the number of characters for the presentation of the sub-image 24 for the date, or of the sub-image 26 for the postage value.

The fields 84b and 84c for the selection code in the respective sub-image datafields 70b and 70c should also be particularly pointed out. These fields respectively have the value zero. It is thus indicated that the frame image 18 for the postage stamp and the frame image 20 for the date stamp have no variants, since they are prescribed by the postal system.

The first picture element datafile 100a defines the picture element data of a first character of the character set for the postage value. In addition to the numerals 0 through 9, this character set also contains a few special characters. The picture element datafile 100a has the hexadecimal value "8002" as a group identification code in a field 104a that, as noted above, identifies the group as a character set. The element identification code in a field 106a has the hexadecimal value "30" that was allocated to the numeral zero of the character set.

The controller can access the actual picture element data for the numeral zero of the postage value character set with the assistance of the data pointer H1. Further picture element datafiles (not shown) that define further characters of the postage value character set can be accessed with the assistance of the picture element pointer F1. A picture element pointer F2 with whose assistance a picture element datafile 100b that defines picture element data for the sub-image 22 for the advertizing can be accessed is located in the last picture element datafile (not shown) of the postage value character set.

The element identification code in a field 106b of the picture element datafile 100b has the value "0001" and thereby identifies the first of several advertizing images. A picture element pointer F3 in the picture element datafile 100b serves for accessing a further picture element datafile 100c.

The group identification number in the field 104c is "8001" in hexadecimal notation. A character of a character set is thus again described by this picture element datafile 100c. The group identification number in the field 104c in this datafile coincides with the group reference code in the field 74d in the sub-image datafile 70d. Since the sub-image datafile 70d offers data for the sub-image 24 for the specific date, the picture element datafile 100c references a character of the character set for the presentation of the date. A picture element pointer F4 of the picture element datafile 100c serves for accessing further picture element datafiles (not shown) wherein the further characters of this character set are defined. The last of the picture element datafiles that are not shown for the characters of the character set for the date has a picture element pointer F5 for accessing a picture element datafile 100d. This picture element datafile 100d has the group identification code "0002" in a field 104d and defines the picture element data for the frame image 20 for the date. The element identification code in a field 106d has the standard value zero since there is only one version of the frame in this specific example.

A picture element pointer F6 of the picture element datafile 100d serves for accessing a last picture element datafile 100e. This picture element datafile 100e has the group identification code "0003" in a second field 104e and describes the frame image 18 for the postage value. A picture element pointer F7 of this picture element datafile has the value zero and, as an end of picture element mark, indicates that no further picture element datafiles are present in the memory.

The picture element datafiles 100a, 100b, 100c, 100d and 100e as well as the further picture element datafiles not shown in FIG. 5 respectively contain pointers H1, H2, H3, H4 and H5 as well as further pointers for the picture element datafiles that are not shown. These pointers enable access to the respective picture element datafiles.

The data structures in FIG. 5 respectively contain text pointers G1 through G12 that allow access to a text that describes the content of the respective data structure. This text can be employed for operator prompting for a flexible user interface.

Important steps, the inventive method for generating a print format that is printed onto a carrier in a postage meter machine first includes the selection of an image datafile corresponding to a predetermination; second, successive processing of the sub-image datafiles that describe the sub-images of the print format to be printed; third, access onto the appertaining picture element data and their compilation in a memory area for the printing ensues for each sub-image datafile.

The method steps according to an exemplary embodiment of the invention are described below with reference to FIGS. 6a, 6b and 6c. At the beginning of the method, it is assumed that all predeterminations for the print format to be printed (step 120) are known. These predeterminations are stored in the main memory of the postage meter machine.

The first basic method step is the selection of the image datafile corresponding to the predetermination for the print format to be printed. To that end, the image datafiles are successively searched until the image datafile whose image identification number agrees with the predetermination for the print format to be printed is found.

Proceeding from the root datafile 30, access ensues to the first image datafile (step 122) with the assistance of the start of image pointer in the root datafile. Before accessing the first image datafile, a determination must be made as to whether the start of image pointer is a zero pointer. If the start of image pointer is a zero pointer, then the method must be aborted with an error message. The aforementioned steps with respect to the identity of the start of image pointer with a zero pointer are not shown in FIG. 6a.

In step 124, which is part of an image datafile search loop with the method steps 124 through 130, a check is made to determine whether the image identification code of the respective image datafile agrees with the predetermination for the print format to be printed. If no coincidence is found, then a check is carried out to determine whether the image datafile pointer of the respective image datafile is a zero pointer (step 126). If this is so, then the method is aborted with an image error message (step 128). Otherwise, when the image pointer points to a further image datafile, this next image datafile is accessed (step 130). Subsequently, method step 124 is repeated, the search loop (steps 124 through 130) being thus closed.

The image datafile search loop (steps 124 through 130) can only be exited from with an error message (step 128) or with a search hit (step 124). When the image identification code of the respective image datafile corresponds to the predetermination (step 124), then the method is continued (step 132) with the access onto the first sub-image datafile that describes the first sub-image of the print format to be printed. For clarity, a prior query with respect to a zero pointer and the potential error message are again not shown in FIG. 6a.

The successive processing of the sub-image datafiles of a sub-image processing loop with method steps 134 through 162 follows as the second basic method step. A determination is made as to whether a picture element datafile can be unambiguously allocated to the respective sub-image (step 134). This is the case when the selection code in the respective sub-image datafile has the value zero. In this case, a standard element identification code is defined (step 136). The picture element datafile belonging to the respective sub-image can be identified in this case on the basis of the group identification code in the corresponding picture element datafile, since only one picture element datafile belongs to this group.

When the selection code of the respective sub-image datafile has a value that is not equal to zero (step 134), then an element identification code is defined (step 138). The definition of this element identification code ensues in different ways dependent on the value of the selection code. When the sub-image described by the respective sub-image datafile is composed of the picture element data of only a single picture element datafile, then the element identification code thereof is defined. When, by contrast, the sub-image is composed of the picture element data of a number of picture element datafiles such as, for example, in the case of the date or postage value, then the element identification code of the respective character or a character chain for the date or postage value is defined in method step 138.

After the definition of the element identification code (step 136 or 138), the method is continued in a character chain processing loop (steps 140 through 162). The first picture element datafile is accessed with the assistance of a start of picture element pointer (step 140). Before the access, a determination must be made that this start of picture element pointer is not a zero pointer. Again for clarity, this step is not shown in FIG. 6b. If it is a zero pointer, then the method is to be aborted in a step that is likewise not shown.

A further basic method step is to seek the picture element datafile whose group identification code and element identification code agrees with the group reference code of the respective sub-image datafile, or to seek the respectively defined element identification code, in a picture element datafile search loop (steps 142 through 150). To that end, a check is made to see whether the group identification code of the respective picture element datafile agrees with the group reference code of the sub-image datafile (step 142). If this is not the case, then a determination is made as to whether the picture element pointer of the respective picture element datafile is a zero pointer (step 144). If this is so, then the method is aborted with an error message (step 146). When the picture element pointer differs from the zero pointer, then the next picture element datafile is accessed with the assistance of the image pointer (step 148) and the method is continued with step 142. The picture element datafile search loop (steps 142 through 150) is thus closed. When it is found that the group identification number of the image datafile is the one sought (step 142), then a check is carried out to determine whether the element identification code of the respective picture element datafile likewise corresponds to the sought element identification code (step 150). If this is not the case, then the method is continued within the picture element datafile search loop (steps 142 through 150) with step 144. When, however, the element identification number also agrees (step 150), then the loop is exited.

The picture element datafile search loop (steps 142 through 150) can thus be exited only in step 144 with an error message (step 146) following thereupon or with a positive search result, i.e., a hit (step 150). In order to accelerate the search of the picture element datafiles, they are expediently arranged such that their succession in the sequence of picture element datafiles is defined dependent on the frequency of access to the respective picture element datafile.

In the following step 152, the picture element data in the identified picture element datafile are accessed with the assistance of the data pointer. Taking the control data in the respective sub-image datafile into consideration, the picture element data can either be copied into a buffer memory of the postage meter machine or the picture element data can be directly employed for the printing by being supplied to a printer unit.

A query is subsequently made as to whether a character chain is to be represented (step 154). When this is the case, then a query is made as to whether the last character has already been reached (step 156). When this is not the case, then the element identification code of the next character in the character chain is identified (step 158) and the method is continued in step 140. A character chain processing loop (steps 140 through 158) is thus closed, this being executed until all appertaining characters of the sub-image have been processed. If it is found that a character chain is not to be represented (steps 140 through 158), then the character chain processing loop is exited. The character chain processing loop (steps 140 through 158) is likewise exited if it is found that the last character of the character chain was reached (step 156). In both instances, the method is continued with a step 160 wherein a determination is made as to whether the sub-image pointer of the respective sub-image datafile is a zero pointer. If this is the case, then the next sub-image datafile is accessed (step 162) and the method is continued with step 134, so that the sub-image processing loop (steps 134 through 162) is closed. If it is found that the sub-image pointer of the respective sub-image datafile is a zero pointer (step 160), then the sub-image processing loop is exited and the method is ended (step 164).

As the result in the execution of the method for generating a print format that is printed onto a carrier in a postage meter machine, the picture element data of the print format to be printed (in the exemplary embodiment of FIG. 1) are in the buffer memory of the postage meter machine. The picture element data are arranged therein such that a printer module can directly access that data.

Figure 6A:
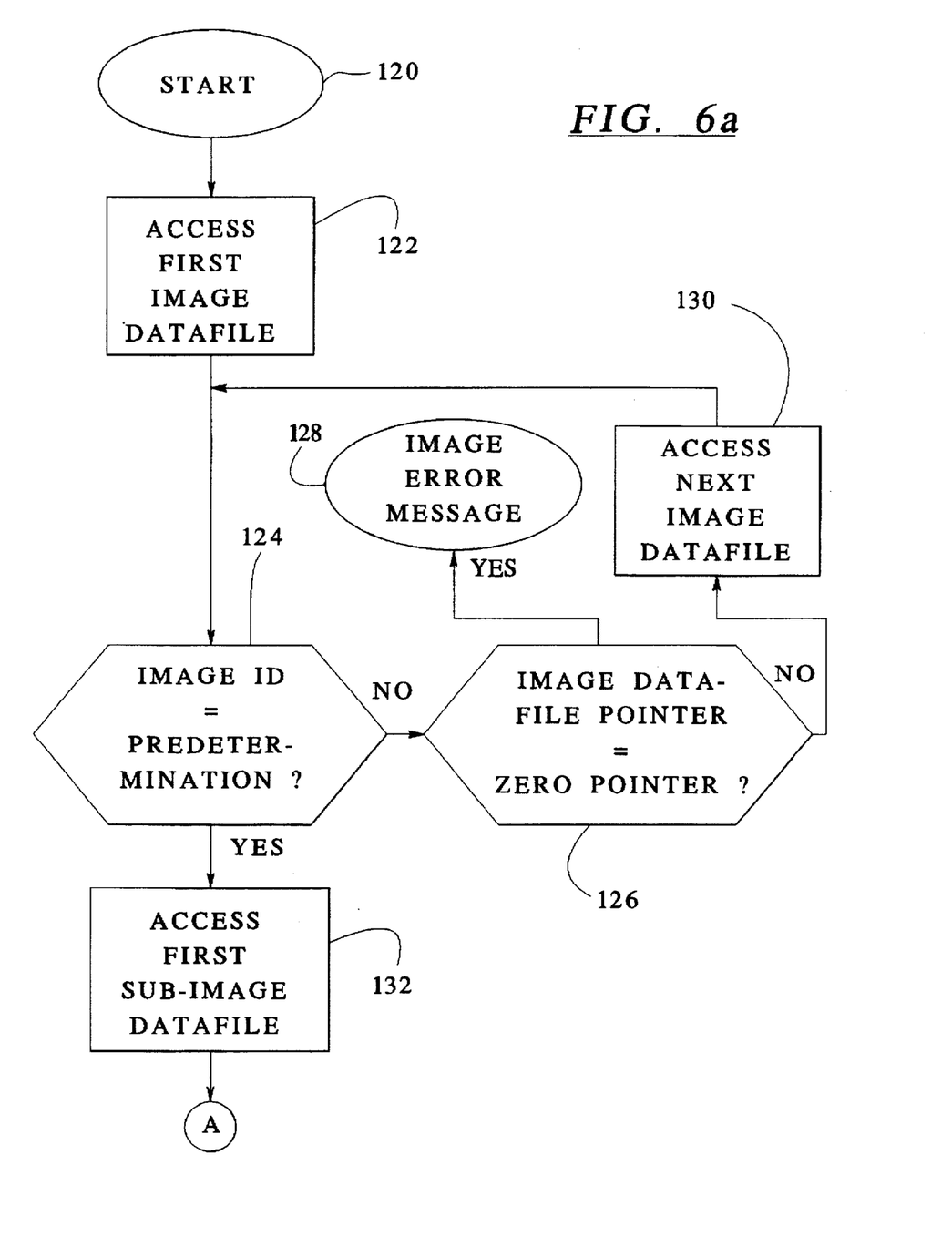
FIGS. 6a, 6b and 6c in combination constitute a flowchart of the inventive method for generating a print format that is printed onto a carrier in a postage meter machine.
Figure 6B:
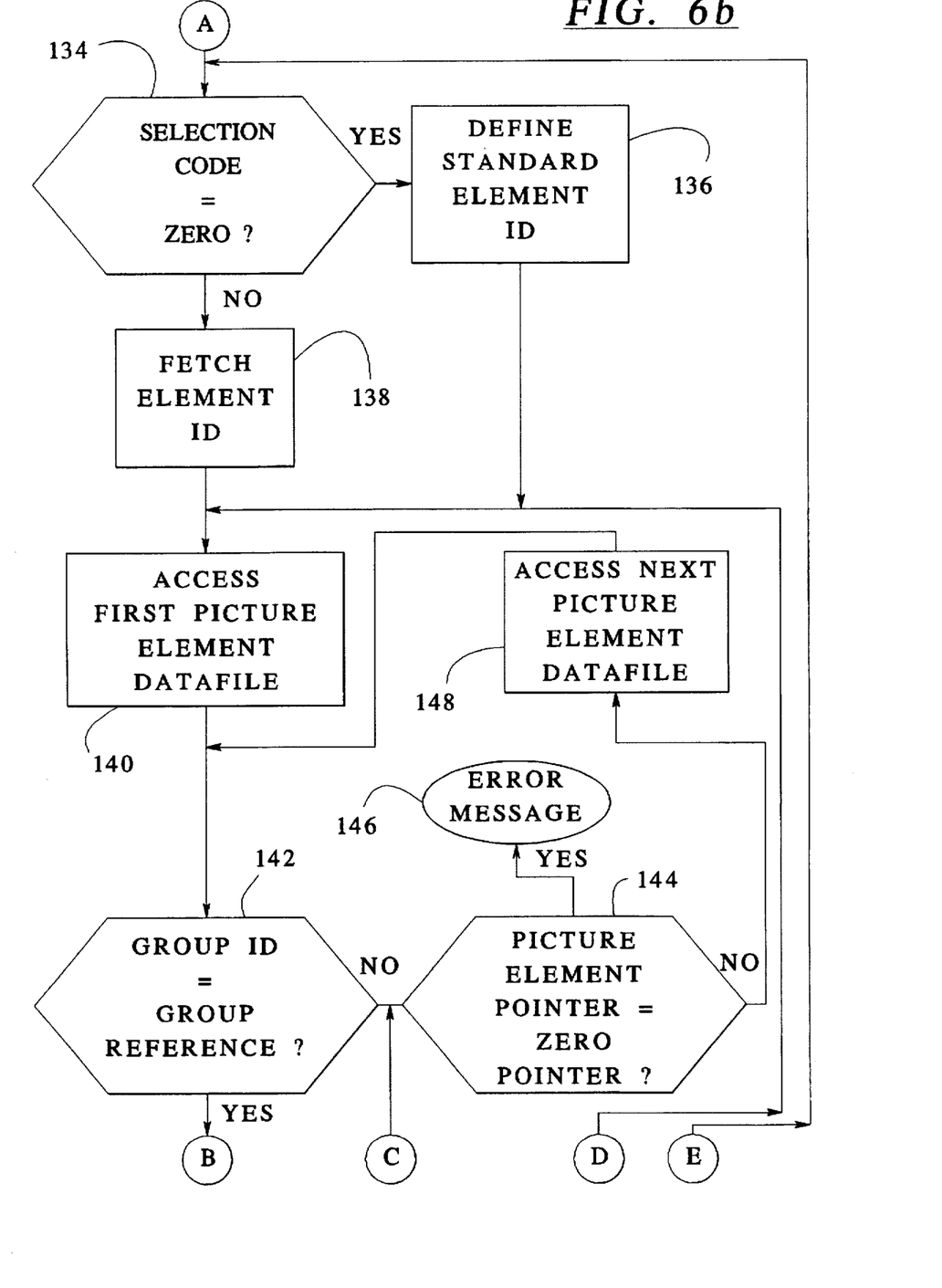
Figure 6C:
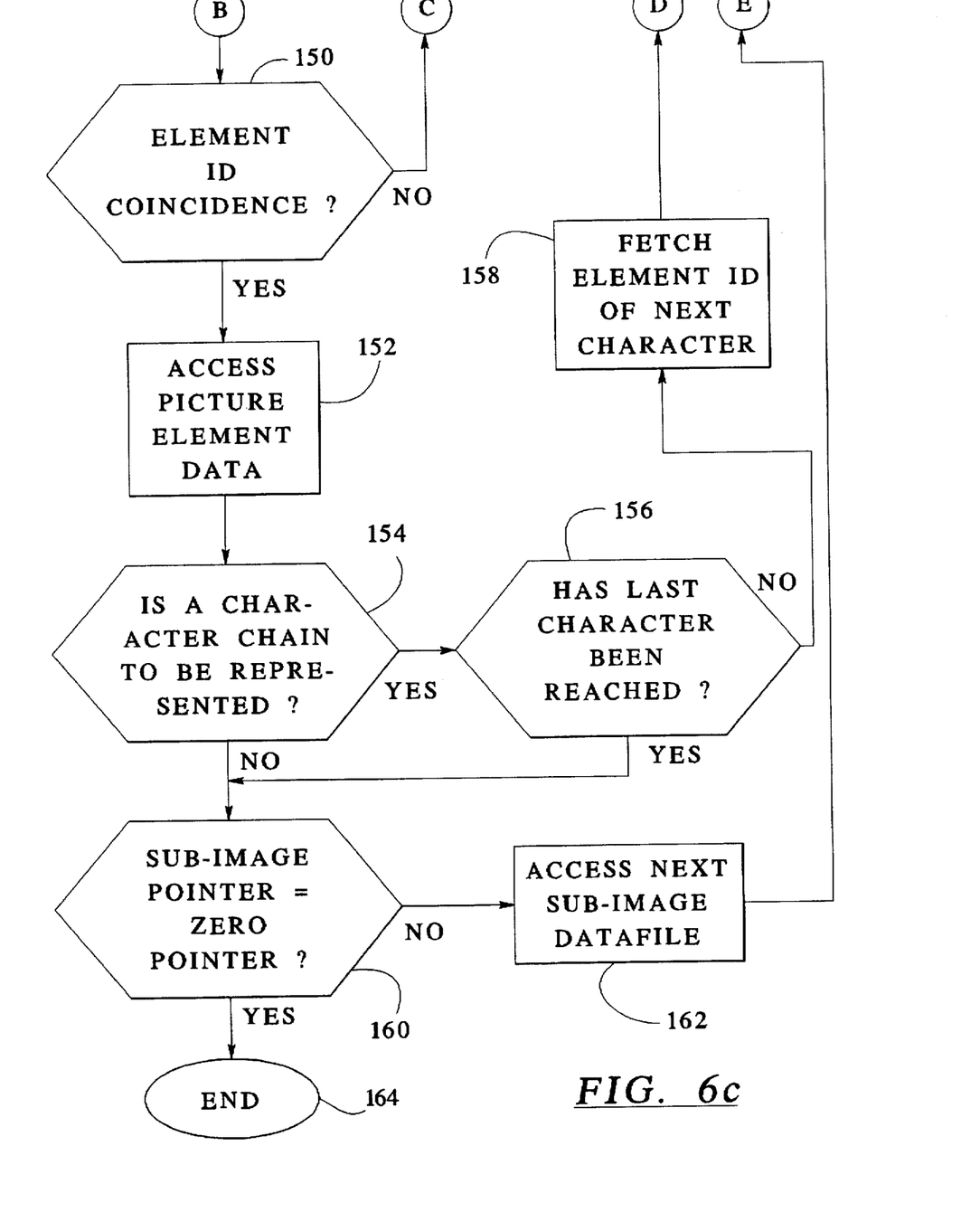

The flowchart shown in FIGS. 6a, 6b and 6c remains unmodified for a broad range of print formats. The only modification is the supply of possible image and text elements in the picture element datafile sequence, and the content of the sub-image datafiles in the sub-image datafile sequence belonging to the respective print format.

When, for example, a so-called numerator that numbers the respective imprint of the stamp image is to be inserted in the vertical direction between the postage stamp image 12 and the date stamp image 14 in, for example, the print format 10, then the modifications described below are to be implemented. A new sub-image datafile must be inserted into or appended to the control datafile 28, this defining the numerator sub-image, for example with respect to its position in the print format 10. Since the sub-image for the numerator to be inserted is a chain of numerals, the first bit in the group reference code of the sub-image datafile is set. Further, a selection code is to be defined with which a determination is made on the basis of a memory cell present in the postage meter machine as to what number print format is being printed at the moment.

To avoid superimposition of the numerator sub-image and the date stamp image 14, the frame image 20 for the date stamp, the sub-image 22 for the advertizing and the sub-image 24 for the date are shifted by modifying their position in the x-direction in the respective sub-image datafiles 70b, 70a and 70d. Since the print format 10 has become wider due to the shift, the value for the width of the print format in the image datafile 50a must also be corrected.

As warranted, additional picture element datafiles that contain the picture element data for the individual numerals must also be inserted into the sequence of picture element datafiles 100a through 100e.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for generating a print format to be printed onto a carrier in a postage meter machine, said print format being composed of a plurality of picture elements arranged in an xy-matrix, comprising the steps of:

storing picture element data in a memory and allocating said picture element data to said picture elements in said xy-matrix under control of a microprocessor;

for generating said print format, accessing, by said microprocessor, a plurality of picture element datafiles, picture element data defining at least one of an image element or a text element of said print format being combined in each said picture element datafile, and allocating an identification code to each picture element datafile which identifies the at least one image element or text element in that datafile;

accessing, by said microprocessor, a control datafile, said control datafile containing a plurality of sub-image datafiles respectively containing sub-image data defining sub-images of said print format;

processing sub-image datafiles, in said microprocessor, of the print format to be printed; and in processing the sub-image datafiles in said microprocessor, employing the sub-image data for generating the print format from the picture element data of at least one picture element datafile identified by its identification code, and ending generation of said print format after processing said sub-image datafiles.

2. A method as claimed in claim 1, comprising the additional steps of:

containing respective reference codes in said sub-image datafiles respectively referencing the identification code of at least one of said picture element datafiles;

allocating respective sub-image sequence codes to said sub-image datafiles for ordering said sub-image datafiles in a sequence of sub-image datafiles;

allocating an end of sub-image mark as the sub-image sequence code for a last of said sub-image datafiles in said sequence of sub-image datafiles, said end of sub-image mark signifying that no further sub-image datafile in said sequence of sub-image datafiles is present;

wherein the step of processing said sub-image datafiles by said microprocessor comprises processing said sub-image datafiles in the order defined by said sequence of sub-image datafiles and ending the generation of the print format upon said microprocessor processing the sub-image datafile having said end of sub-image mark allocated thereto.

3. A method as claimed in claim 2, comprising the additional step of: employing an address pointer having a value of zero as said end of sub-image mark.

4. A method as claimed in claim 2, comprising the additional steps of:

allocating respective picture element sequence codes to said picture element datafiles for ordering said picture element datafiles in a sequence of picture element datafiles;

allocating an end of picture element mark as the picture element sequence code for a last of said picture element datafiles in said sequence of picture element datafiles, said end of picture element mark indicating that no further picture element datafile is present in said sequence of picture element datafiles;

searching, by said microprocessor, said sequence picture element datafiles for the identification code of the picture element datafile referenced by said reference code; and accessing the picture element datafile having said identification code referenced by said reference code when said microprocessor finds the identification code referenced by said reference code, and said microprocessor generating an error message if said microprocessor reaches said end of picture element mark.

5. A method as claimed in claim 4, comprising the additional step of:

employing an address pointer having a value of zero as said end of picture element mark.

6. A method as claimed in claim 4, wherein the step of allocating respective picture element sequence codes to said picture element datafiles comprises ordering said picture element datafiles in said sequence of said picture element datafiles dependent on a frequency of access to respective picture element datafiles.

7. A method as claimed in claim 1, comprising the additional steps of:

including a plurality of image datafiles in said control datafile, each image datafile containing print format data defining a different print format;

allocating respective image identification codes to said image datafiles identifying the respective print format in the image datafile;

allocating respective image sequence codes to said image datafiles for ordering said image datafiles in a sequence of image datafiles;

allocating an end of image mark as the image sequence code for a last image datafile in said sequence image datafiles, said end of image mark indicating that no further image datafile is present in said sequence of image datafiles;

searching, by said microprocessor when accessing said control datafile, said sequence of image datafiles for an image identification code corresponding to a print format to be printed according to a predetermination; and employing, in said microprocessor, the print format data of the image datafile having said image identification code corresponding to the print format to be printed according to the predetermination, for controlling generation of said print format when said microprocessor finds said image identification code corresponding to said print format to be printed according to said predetermination, and said microprocessor generating an image error message if said microprocessor reaches said end of image mark.

8. A method as claimed in claim 7, comprising the additional step of:

employing an address pointer having a value of zero as said end of image mark.

9. A method as claimed in claim 1, comprising the additional step of copying, in said microprocessor, said picture element data for said print format to be printed into a separate memory area and thus compiling said picture element data for direct printing.

10. A method as claimed in claim 1, comprising the additional steps of:

allocating, to each picture element datafile, a group identification code for accessing a plurality of picture element datafiles having the same group identification code, and an element identification code identifying the picture element datafile in the group to which it is allocated by said group identification code; and allocating a group reference code to each sub-image datafile for associating sub-image datafiles with picture element datafiles having the same group identification code, and allocating a selection code to each sub-image datafile which selects a control program for defining at least one element identification code.

11. A method as claimed in claim 10, comprising the additional steps of:

including in said selection code a predetermined value indicating that only a single picture element datafile is identified by said group reference code; and selecting a standard element identification code as element identification code if said predetermined value is found by said microprocessor.

12. A method as claimed in claim 1, comprising the additional step of storing said control datafile in a first memory area and storing said picture element datafiles in a second memory area, separate from said first memory area.

13. A method as claimed in claim 1, comprising the additional step of allocating a descriptive text to at least one datafile among said picture element datafiles and said sub-image datafiles describing contents of said at least one datafile.

14. A method as claimed in claim 13, comprising the additional steps of:

comprising the additional step of storing said control datafile in a first memory area and storing said picture element datafiles in a second memory area, separate from said first memory area; and storing said descriptive text in a third memory area separate from said first and second memory areas.

15. A method as claimed in claim 1, comprising the additional step of:

including at least one picture element datafile among said plurality of picture element datafiles which contains picture element data representing an element of a machine-readable identification.

16. A method as claimed in claim 1, comprising the additional steps of:

allocating multiple picture elements of different picture element datafiles to each of at least some of the picture elements of said xy-matrix; and operating on the picture element data with said microprocessor using an operation code contained in said control datafile.

17. A method for generating a print format to be printed onto a carrier in a postage meter machine, said print format being composed of a plurality of picture elements arranged in an xy-matrix, comprising the steps of:

storing picture element data in a memory and allocating said picture element data to said picture elements in said xy-matrix under control of a microprocessor;

for generating said print format, accessing, by said microprocessor, a plurality of picture element datafiles, picture element data defining at least one of an image element or a text element of said print format being combined in each said picture element datafile, and allocating an identification code to each picture element datafile which identifies the at least one image element or text element in that datafile, and allocating respective picture element sequence codes to said picture element datafiles for ordering said picture element datafiles in a picture element datafile sequence, and allocating an end of picture element mark as the picture element sequence code for a last picture element datafile in said sequence picture element datafiles, said end of picture element mark indicating that no further picture element datafile is present in said sequence picture element datafiles;

accessing, by said microprocessor, a control datafile containing control data for a print format to be printed, at least one of said identification codes being referenced in said control datafile which contains a text element or an image element to be printed in said print format;

searching, by said microprocessor, said sequence picture element datafiles for said at least one identification code; and employing, in said microprocessor, the picture element data of a picture element datafile allocated to said at least one identification code for generating said print format, and said microprocessor generating an error message if said microprocessor reaches said end of picture element mark.

18. A method as claimed in claim 17, wherein the step of allocating respective picture element sequence codes to said picture element datafiles comprises ordering said picture element datafiles in said sequence of said picture element datafiles dependent on a frequency of access to respective picture element datafiles.

19. A method as claimed in claim 17, comprising the additional steps of:

including a plurality of sub-image datafiles in said control datafile, each sub-image datafile containing sub-image data forming a sub-image of said print format;

allocating respective reference codes to said sub-image datafiles identifying at least one of said identification codes of said picture element datafiles;

allocating respective sub-image sequence codes to said sub-image datafiles for ordering said sub-image datafiles in a sequence of sub-image datafiles;

allocating an end of sub-image mark as the sub-image sequence code for a last sub-image datafile in said sequence of sub-image datafiles, said end of sub-image mark indicating that no further sub-image datafile is present in said sequence of sub-image datafiles;

processing, in said microprocessor, said sub-image datafiles in the order defined by said sequence of sub-image datafiles when accessing said control datafile;

employing, in said microprocessor, the sub-image data for controlling generation of said print format in the processing of said sub-image datafiles, and said microprocessor ending generation of the print format when said microprocessor reaches said end of sub-image mark.

20. A method as claimed in claim 19, comprising the additional step of:

employing an address pointer having a value of zero as said end of sub-image mark.

21. A method as claimed in claim 17, comprising the additional steps of:

allocating, to each picture element datafile, a group identification code for accessing a plurality of picture element datafiles having the same group identification code, and an element identification code identifying the picture element datafile in the group to which it is allocated by said group identification code; and allocating a group reference code to each sub-image datafile for associating sub-image datafiles with picture element datafiles having the same group identification code, and allocating a selection code to each sub-image datafile which selects a control program for defining at least one element identification code.

22. A method as claimed in claim 21, comprising the additional steps of:

including in said selection code a predetermined value indicating that only a single picture element datafile is identified by said group reference code; and selecting a standard element identification code as element identification code if said predetermined value is found by said microprocessor.

23. A method as claimed in claim 17, comprising the additional steps of:

including a plurality of image datafiles in said control datafile, each image datafile containing print format data defining a different print format;

allocating respective image identification codes to said image datafiles identifying the respective print format in the image datafile;

allocating respective image sequence codes to said image datafiles for ordering said image datafiles in a sequence of image datafiles;

allocating an end of image mark as the image sequence code for a last image datafile in said sequence image datafiles, said end of image mark indicating that no further image datafile is present in said sequence of image datafiles;

searching, by said microprocessor when accessing said control datafile, said sequence of image datafiles for an image identification code corresponding to a print format to be printed according to a predetermination; and employing, in said microprocessor, the print format data of the image datafile having said image identification code corresponding to the print format to be printed according to the predetermination, for controlling generation of said print format when said microprocessor finds said image identification code corresponding to said print format to be printed according to said predetermination, and said microprocessor generating an image error message if said microprocessor reaches said end of image mark.

24. A method as claimed in claim 23, comprising the additional step of:

employing an address pointer having a value of zero as said end of image mark.

25. A method as claimed in claim 17, comprising the additional step of copying, in said microprocessor, said picture element data for said print format to be printed into a separate memory area and thus compiling said picture element data for direct printing.

26. A method as claimed in claim 17, comprising the additional step of storing said control datafile in a first memory area and storing said picture element datafiles in a second memory area, separate from said first memory area.

27. A method as claimed in claim 17, comprising the additional step of allocating a descriptive text to at least one datafile among said picture element datafiles and said sub-image datafiles describing contents of said at least one datafile.

28. A method as claimed in claim 27, comprising the additional steps of:

storing said control datafile in a first memory area and storing said picture element datafiles in a second memory area, separate from said first memory area; and storing said descriptive text in a third memory area separate from said first and second memory areas.

29. A method as claimed in claim 17, comprising the additional step of:

including at least one picture element datafile among said plurality of picture element datafiles which contains picture element data representing an element of a machine-readable identification.

30. A method as claimed in claim 17, comprising the additional steps of:

allocating multiple picture elements of different picture element datafiles to each of at least some of the picture elements of said xy-matrix; and operating on the picture element data with said microprocessor using an operation code contained in said control datafile.

31. A method as claimed in claim 17, comprising the additional step of:

employing an address pointer having a value of zero as said end of picture element mark.

* * * * *